United States Patent Office 3,356,718
Patented Dec. 5, 1967

3,356,718
PREPARATION OF DICARBOXYADAMANTANE COMPOUNDS FROM DIHALOADAMANTANES
Robert E. Moore, Wilmington, Del., assignor to Sun Oil Company, Philadelphia, Pa., a corporation of New Jersey
No Drawing. Filed Apr. 22, 1965, Ser. No. 450,182
13 Claims. (Cl. 260—514)

This invention relates to the preparation of 1,3-dicarboxyadamantanes from dibromo or dichloro derivatives of adamantane and alkyladamantanes by reaction thereof with formic acid in the presence of fuming sulfuric acid.

The carbon nucleus of adamantane (tricyclo-[3.3.1.-$1^{3,7}$]decane) contains ten carbon atoms arranged in a completely symmetrical, strainless manner such that four of the carbon atoms occupy bridgehead positions in the rings. The structure of adamantane can be depicted typographically as follows:

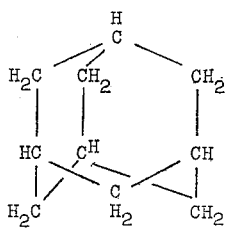

The molecule contains four tertiary hydrogen atoms attached respectively at the bridgehead carbon atoms. All four bridgehead carbons are equivalent to each other and likewise all rings are equivalent.

The 1,3-dicarboxy compounds prepared in accordance with the invention contain an adamantane group consisting of an adamantane nucleus or an alkyladamantane moiety in which either one or two alkyl groups are attached to the adamantane nucleus either at bridgehead or non-bridgehead positions. The total number of carbon atoms in the alkyl substituent group or groups is in the range of 1–10 inclusive. The dicarboxy compounds correspond to the formula

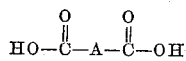

in which A represents the aforesaid adamantane or alkyladamantane group. In these compounds each carboxyl group is attached to a bridgehead carbon of the adamantane nucleus; hence the compounds are all 1,3-derivatives of the adamantane hydrocarbon to which they correspond.

The foregoing class of compounds which can be prepared according to the invention includes compounds in which the adamantane nucleus has substituents at each birdgehead carbon atom and hence contains no tertiary hydrogen atoms. The substituents at the 1- and 3-positions are the carboxyl groups and those at the 5- and 7-positions are alkyl groups having a total of from 2 to 10 carbon atoms. Such alkyl groups can be methyl, ethyl, propyl, butyl or the like. The compounds of this subclass are 1,3-dicarboxy-5,7-dialkyladamantanes. The preferred compound of this sub-class is 1,3-dicarboxy-5,7-dimethyladamantane.

The compounds produced in the present process are prepared from dibromo or dichloro derivatives of adamantane or alkyladamantanes in which the halogen atoms originally can be attached to the adamantane nucleus at either bridgehead or non-bridgehead positions or both. These dihalo compounds are reacted with formic acid in the presence of fuming sulfuric acid. Upon mixing the resulting reaction mixture with water the desired dicarboxy compound is formed by a hydrolysis or solvolysis reaction and can be recovered from the mixture. The product is the 1,3-dicarboxyl derivative of adamantane or alkyladamantane even in cases where one or both of the halogen atoms originally was attached to the nucleus at a non-bridgehead position. This result is obtained due to the fact that the fuming sulfuric acid used to effect the conversion also will cause isomerization to a bridgehead position of any halogen atom originally attached to a non-bridgehead carbon.

By way of example of the invention, 1,3-dibromo-5,7-dimethyladamantane is reacted with anhydrous formic acid in the presence of fuming sulfuric acid (e.g., 103% $H_2SO_4$ equivalent) and the reaction product is then diluted with water. The product is 1,3-dicarboxy-5,7-dimethyladamantane obtained in the form of white crystals. The reactions which occur in forming this product can be illustrated as follows:

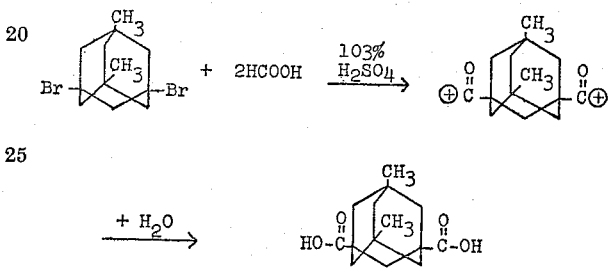

As indicated the formic acid reacts at each site of the bromine atoms by what appears to be a carbonium ion mechanism and apparently produce at each site an intermediate

carbonium ion group. In this initial reaction the bromine atoms become bound or taken up by the strong sulfuric acid in some manner. In order to obtain the desired product it is essential to dilute the acid solution with a large amount of water in order to allow hydrolysis or solvolysis to proceed to form the two carboxy groups. When the reaction mixture is diluted with sufficient water, the 1,3-dicarboxy-5,7-dimethyladamantane precipitates as white crystals and can be separated by filtration.

The dihalo reactant in the present process can be a dibromo or dichloro derivative of adamantane itself or of any alkyladamantane having attached to the adamantane nucelus 1–2 alkyl groups containing 1–10 total carbon atoms. The two halogen atoms are attached to the adamantane nucleus and can be attached to bridgehead and/or non-bridgehead carbon atoms of the nucleus. Examples of such reactants are the dibromo or dichloro derivatives of the following hydrocarbons: adamantane; 1-methyl or 2-methyladamantane; 1-ethyl or 2-ethyladamantane; 1,2-dimethyl or 1,3-dimethyladamantane; 1-methyl-3-ethyladamantane; diethyladamantanes; 1-n-propyl or 1-isopropyladamantane; 1-n-butyladamantane; 1,3-di-n-pentyladamantane; 1-methyl-3-heptyladamantane; and 1-n-decyladamantane. Such dihalo derivatives can be prepared by reacting the corresponding adamantane hydrocarbon with chlorine or bromine in the presence of $AlCl_3$ or $AlBr_3$, as disclosed in Stetter and Wulff German Patent No. 1,101,410. Methods of preparation also are discussed by Stetter in Angew. Chem. Internat. Edit., Vol. 1 (1962), No. 6, pages 287–288.

In reacting the forming acid with the dihaloadamantane compound fuming sulfuric acid having a strength in the range of 100–110% $H_2SO_4$ equivalent by weight is employed and the strength of the fuming acid preferably is in the range of 102–106% $H_2SO_4$. The amount of fuming acid used should be such that the molar ratio of $H_2SO_4$ to the dihaloadamantane compound is at least 10:1 and more preferably at least 20:1.

The formic acid reactant preferably is employed in substantially anhydrous form. The amount of the formic acid used should be such that at least one molecule of it is available to react at the site of each halogen atom or in other words that the molar ratio of the formic acid to the dihaloadamantane compound is above 2:1. An excess of formic acid over this ratio is desirable and a ratio of say 5:1 typically can be used. Larger proportions of the formic acid are not detrimental.

In carrying out the present process the dihaloadamantane compound preferably is first dissolved in the fuming sulfuric acid in a proportion such that the molar ratio of $H_2SO_4$ to the dihalo compound is as above specified. This can be done merely by adding the dihalo compound to the sulfuric acid at room temperature and stirring for several minutes. As the compound goes into solution some release of heat occurs but the exotherm is relatively mild. In cases where a dibromo compound has been used as reactant, the resulting solution has a deep red or maroon color. After the dihalo reactant has been dissolved, formic acid is added to the mixture while agitating the same and reaction takes place as indicated by the first step of the equation given above. This reaction preferably should be carried out at temperature below 20° C. and more preferably in the range of 0–10° C., as the use of too high a reaction temperature will tend to cause decarboxylation of the desired diacid product.

After the first phase of the overall reaction has been completed, the mixture is admixed with a relatively large volume of water to effect hydrolysis or solvolysis and produce the desired diacid product. Preferably this is done by pouring the strongly acidic mixture over cracked ice to effect dilution while simultaneously preventing the temperature from rising an inordinate amount. Enough water (ice) should be used to adequately decrease the strength of the sulfuric acid so that hydrolysis or solvolysis will occur and the diacid product will precipitate. Generally the strength of the diluted acid should be less than 50% $H_2SO_4$ and more preferably less than 20%. After this final reaction has been effected, the precipitated diacid product can be separated from the mixture by filtration.

The following example specifically illustrates the invention:

*Example*

This example shows the preparation of 1,3-dicarboxy-5,7-dimethyladamantane. To 35 ml. of fuming sulfuric acid having a strength of 103% $H_2SO_4$ equivalent by weight and cooled to about 10° C., 3.22 g. (0.01 mole) of 1,3-dibromo-5,7-dimethyladamantane in powder form are added and the mixture is stirred to dissolve the dibromo compound in the fuming acid. The resulting solution has a deep red or maroon color. The molar ratio of $H_2SO_4$ equivalent to dibromo compound is about 68:1. The mixture is maintained at about 10° C. and is stirred while 3.0 g. (0.065 mole) of anhydrous formic acid are added slowly thereto over a period of 30 minutes, following which the mixture is stirred for 45 minutes additionally to insure completion of the reaction. The molar ratio of formic acid to the dibromo compound is 6.5:1. The reaction mixture is then poured slowly over 300 g. of cracked ice, whereupon melting of the ice and the resulting dilution of the acid solution causes hydrolysis to take place to form the diacid product in the form of a finely divided precipitate. In the reaction with water the color of the mixture changes to light amber. The mixture is filtered and the residue is washed with benzene to remove any monocarboxylic acid which may be present due to decarboxylation. The residue then is washed with water, dried and recrystallized from a 50:50 mixture of benzene and acetone. A white crystalline product is obtained in amount of 2.4 g. This product is determined by vapor phase chromatography, infrared and nuclear magnetic resonance analyses to be substantially pure 1,3-dicarboxy-5,7-dimethyladamantane. It has a melting point of 268° C. and the yield thereof is 95% based on theory.

When dibromoadamantane or the dibromo derivatives of other alkyladamantanes as herein specified are used in place of 1,3-dibromo-5,7-dimethyladamantane, similar results are obtained as in the preceding example. Likewise when the corresponding dichloro derivatives are used in place of the dibromo compounds, substantially the same results are secured.

The diacid adamantane compounds prepared according to the present invention can be polymerized with difunctional compounds such as diamines or dialcohols. Hence the products of the present invention have utility in the manufacture of polyamides or polyesters which can be used in the manufacture of fibers, films and molded articles.

Heretofore in the prior art as disclosed by Stetter and Wulff, Chem. Ber., Vol. 93, page 1366 (1960), 1,3-dicarboxyadamantane has been prepared from a mixture of 1,3-dibromoadamantane, silver sulfate and formic acid in the presence of concentrated (96%) sulfuric acid. With acid of such strength, the presence of silver sulfate in the reaction mixture is essential as otherwise the dicarboxy product will not be obtained. The present method of making 1,3-dicarboxyadamantane compounds is distinctly advantageous over such prior art method in that the present method does not require the use of an expensive silver salt as the former method does. It is further advantageous in that higher yields of the diacid product can readily be obtained. For example, a yield of 80% of the theoretical was obtained according to the aforesaid prior art reference whereas the present method will readily give yields of the order of 95% on theory.

I claim:

1. Method of preparing a 1,3-dicarboxyadamantane which comprises dissolving a dihaloadamantane compound, selected from the group consisting of dibromo and dichloro derivatives of adamantane and alkyladamantanes having attached to the adamantane nucleus 1–2 alkyl groups containing 1–10 total carbon atoms, in fuming sulfuric acid having a strength corresponding to 100–110% $H_2SO_4$ equivalent by weight, the molar ratio of $H_2SO_4$ to said dihaloadamantane compound being at least 10:1, reacting the mixture at a temperature below 20° C. with formic acid in amount of at least two moles of formic acid per mole of said dihaloadamantane compound, mixing the reaction mixture with water and separating said 1,3-dicarboxyadamantane compound from the resulting mixture.

2. Method according to claim 1 wherein the molar ratio of $H_2SO_4$ to said dihaloadamantane compound is at least 20:1.

3. Method according to claim 2 wherein the strength of the fuming sulfuric acid is in the range of 102–106% $H_2SO_4$ equivalent and the reaction temperature is maintained in the range of 0° C. to 20° C. during the reaction of the formic acid.

4. Method according to claim 3 wherein said temperature is maintained below 10° C.

5. Method according to claim 1 wherein said dihaloadamantane compound is a 1,3-dibromo-5,7-dialkyladamantane.

6. Method according to claim 1 wherein said dihaloadamantane compound is a 1,3-dichloro-5,7-dialkyladamantane.

7. Method of preparing 1,3-dicarboxy-5,7-dimethyladamantane which comprises dissolving 1,3-dihalo-5,7-dimethyladamantane in which the halogen is selected from the group consisting of bromine and chlorine in fuming sulfuric acid having a strength corresponding to 100–110% $H_2SO_4$ equivalent by weight, the molar ratio of $H_2SO_4$ to said dihalodimethyladamantane being at least 10:1, reacting the mixture at a temperature below 20° C.

with formic acid in amount of at least 2 moles per mole of dihalodimethyladamantane, mixing the reaction mixture with water and separating 1,3-dicarboxy-5,7-dimethyladamantane from the resulting mixture.

8. Method according to claim 7 wherein said ratio of $H_2SO_4$ to said dihalodimethyladamantane is at least 20:1.

9. Method according to claim 8 wherein said temperature is maintained in the range of 0–10° C.

10. Method according to claim 7 wherein the dihalodimethyladamantane si 1,3-dibromo-5,7-dimethyladamantane and said strength is in the range of 102–106% $H_2SO_4$ equivalent.

11. Method according to claim 7 wherein the dihalodimethyladamantane is 1,3-dichloro-5,7-dimethyladamantane and said strength is in the range of 102–106% $H_2SO_4$ equivalent.

12. Method according to claim 1 wherein at least one of the halo groups in said dihaloadamantane compound is located at a non-bridgehead position.

13. Method according to claim 1 wherein both halo groups in said dihaloadamantane compound are located at non-bridgehead positions.

References Cited

UNITED STATES PATENTS 3,250,805   5/1966   Lamola _____ 260—468 X

OTHER REFERENCES

Koch et al., Angewandte Chemie, Vol. 72, page 628 (1960).

Fort et al., Chem. Rev. Vol. 64, pp. 287–288 (1964).

Koch et al., Liebig's Annalen der Chemie, Vol. 618 (1958), pp. 251–266.

LORRAINE A. WEINBERGER, *Primary Examiner.*

R. K. JACKSON, *Examiner.*

P. J. KILLOS, *Assistant Examiner.*